(12) United States Patent
Kansakoski et al.

(10) Patent No.: US 6,377,813 B1
(45) Date of Patent: Apr. 23, 2002

(54) FORWARD LINK CLOSED LOOP POWER CONTROL FOR A THIRD GENERATION WIDEBAND CDMA SYSTEM

(75) Inventors: Antti Kansakoski; Jean-Marie Tran, both of San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/205,137

(22) Filed: Dec. 3, 1998

(51) Int. Cl.[7] ............................................. H04B 7/005
(52) U.S. Cl. .................... 455/522; 455/69; 370/335; 370/342
(58) Field of Search ..................... 455/69, 522, 238.1; 370/335, 342; 375/140, 142

(56) References Cited

U.S. PATENT DOCUMENTS

| | | | |
|---|---|---|---|
| 5,349,630 A | 9/1994 | Sointula | 379/58 |
| 5,564,074 A | 10/1996 | Juntti | 455/67.1 |
| 5,570,353 A | 10/1996 | Keskitalo et al. | 370/18 |
| 5,787,348 A | 7/1998 | Willey et al. | 455/441 |
| 5,924,043 A | * 7/1999 | Takano | 455/522 |
| 6,035,209 A | * 3/2000 | Teidemann et al. | 455/522 |

OTHER PUBLICATIONS

Tiedemann, Edward G. Jr. et al., "The Evolution of IS–95 to a Third Generation System and to the IMT–2000 Era", Acts Mobile Communications Summit, vol. 2, Oct. 10, 1997, 7 pages.

* cited by examiner

*Primary Examiner*—Lee Nguyen
(74) *Attorney, Agent, or Firm*—Perman & Green, LLP (57) ABSTRACT

A wireless telecommunications mobile station, which is bi-directionally coupled to a base station through a communication channel, includes a device for receiving signals over the communication channel from the base station, power control circuitry for selectively deriving power control commands, and a device for transmitting the selectively derived power control commands to the base station. The power control circuitry of the mobile station provides, in cooperation with power control circuitry of the base station, closed loop power control to the communication channel. The power control circuitry includes circuitry for selectively deriving power control commands based on one of first power control commands or second power control commands in response to a determined mobility of the mobile station. The determined mobility can be indicative of a Doppler shift of carrier transmitted from the base station, or a velocity derived from the Doppler shift.

22 Claims, 10 Drawing Sheets

FORWARD LINK CLOSED LOOP POWER CONTROL FOR A THIRD GENERATION WIDEBAND CDMA SYSTEM

FIELD OF THE INVENTION

This invention relates generally to radiotelephone systems and, in particular, to a radiotelephone system having third generation wideband code division multiple access (WCDMA) capability.

BACKGROUND OF THE INVENTION

A proposed IS-95 third generation (IS-95 3G) radiotelephone system has a wideband, spread spectrum radio interface that uses CDMA technology. The system is expected to meet all of the requirements for the next generation evolution of the current TIA/EIA-95-B family of standards. This includes providing support for the following: a wide range of operating environments (indoor, low mobility, full mobility, and fixed wireless); a wide performance range (from voice and low speed data to very high speed packet and circuit data services); and a wide range of advanced services (including voice only, simultaneous voice and data, data only, and location services). Support is also provided for an advanced Multimedia Quality of Service (QoS) Control capability supporting multiple concurrent voice, high speed packet data, and high speed circuit data services, along with sophisticated QoS management capabilities. A modular structure is proposed to support existing Upper Layer Signaling protocols as well as a wide range of future third generation Upper Layer Signaling protocols. The proposed system is also expected to provide a seamless interoperability and handoff with existing TIA/EIA-95-B systems, and to provide a smooth evolution from existing TIA/EIA-95-B based systems (including support for overlay configurations within the same physical channel as existing TIA/EIA-95-B systems). The proposed system will also support highly optimized and efficient deployments in clear spectrum (in cellular, PCS, and IMT-2000 spectrums), and will offer support for existing TIA/EIA-95-B services, including speech coders, packet data services, circuit data services, facsimile services, Short Messaging Services (SMS), and Over the Air Activation and Provisioning.

In a system operating according to the TIA/EIA-95-B standard a mobile station provides three techniques for output power adjustment (see Section 6.1.2 of IS-95). The three techniques are an open loop estimation based solely on mobile station operation, a closed loop correction that involves both the mobile station and the base station, and an outer loop Frame Error Rate (FER) based technique. In the closed loop and the outer loop correction techniques, the mobile station responds to power control bits received over a forward traffic channel to adjust its output power level.

Power control in a CDMA system is also described in a publication entitled an "Introduction to CDMA and the Proposed Common Air Interface Specification (CAI) for a Spread Spectrum Digital Cellular Standard—An Overview of the Application of Code Division Multiple Access (CDMA) to Digital Cellular Systems and Personal Cellular Networks", by QUALCOMM Incorporated, Mar. 28, 1992. As is described in this publication, the goal of the mobile station transmitter power control process is to produce, at a cell site receiver or base station, a nominal received signal power from each mobile station transmitter that is operating within the cell. If all mobile stations are so controlled, the end result is that the total signal power received at the cell site from all the mobile stations is equal to the nominal received power times the number of mobile stations. It can therefore be appreciated that the control of the transmitter power is an important consideration when designing mobile stations for operation in the CDMA telecommunications systems.

Of particular interest to the teaching of this invention is the closed loop power control in the forward link transmissions from a base station to a mobile station in the proposed IS-95 3G radiotelephone system. In the IS-95 3G system, power control on the forward link is performed every 1.25 ms or at an 800 Hz refresh rate. As such, a mobile station may request more power or less power for its traffic channels and the power control on the forward link occurs in the base station.

In general, mobile stations employ power control algorithms to determine the power levels required for effective operation. Typically, power control algorithms require that estimates of a traffic channel's signal to noise ratio (SNR) are performed in the mobile station. The SNR and other factors are utilized by the power control algorithm to determine an appropriate power level for effective mobile station operation.

As is known by those skilled in the art, link performance is better with power control for a mobile station moving at a low velocity than for a mobile station moving at a high velocity. These performance observations are presented in a paper entitled "The Evolution of IS-95 to a Third Generation System and to the IMT-2000 Era", by Edward G. Tiedemann, Jr., Yu-Cheun Jou, and Joseph P. Odenwalder, ACTS Mobile Communications Summit '97, Vol. 2, pages 924–929, dated Oct. 7–10, 1997.

Figure 3A:
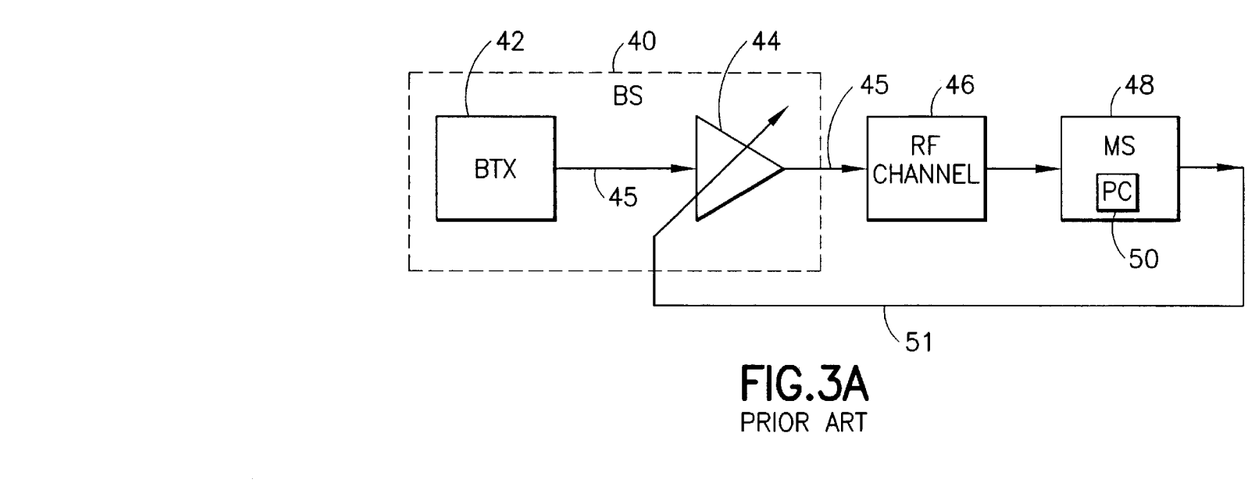
FIG. 3A is a schematic block diagram of power control in a CDMA communication system as known in the prior art.
Figure 3B:
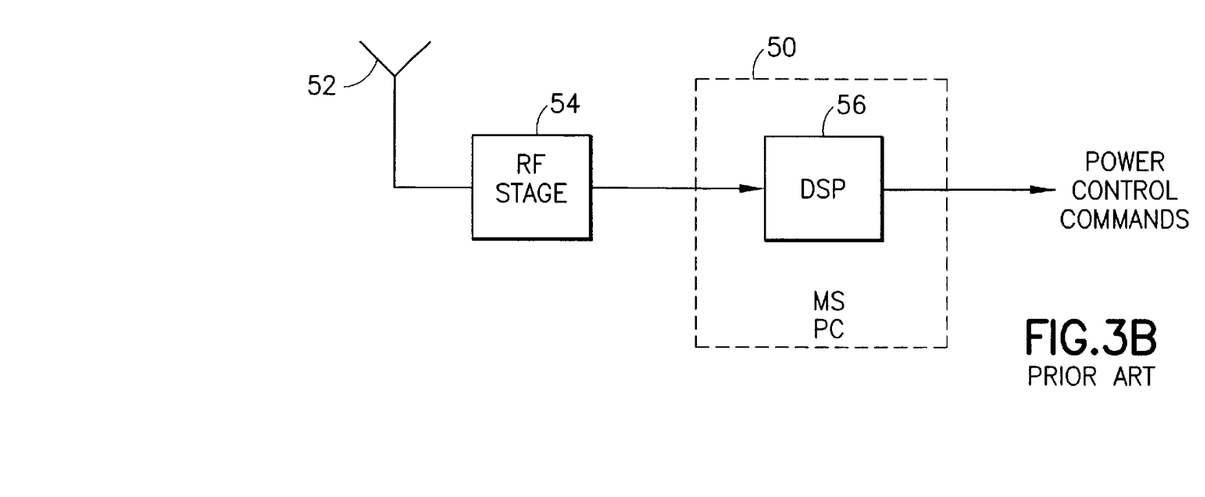
FIG. 3B is a schematic block diagram of power control in a mobile station operating within the CDMA communication system of FIG. 3A.
Figure 3C:
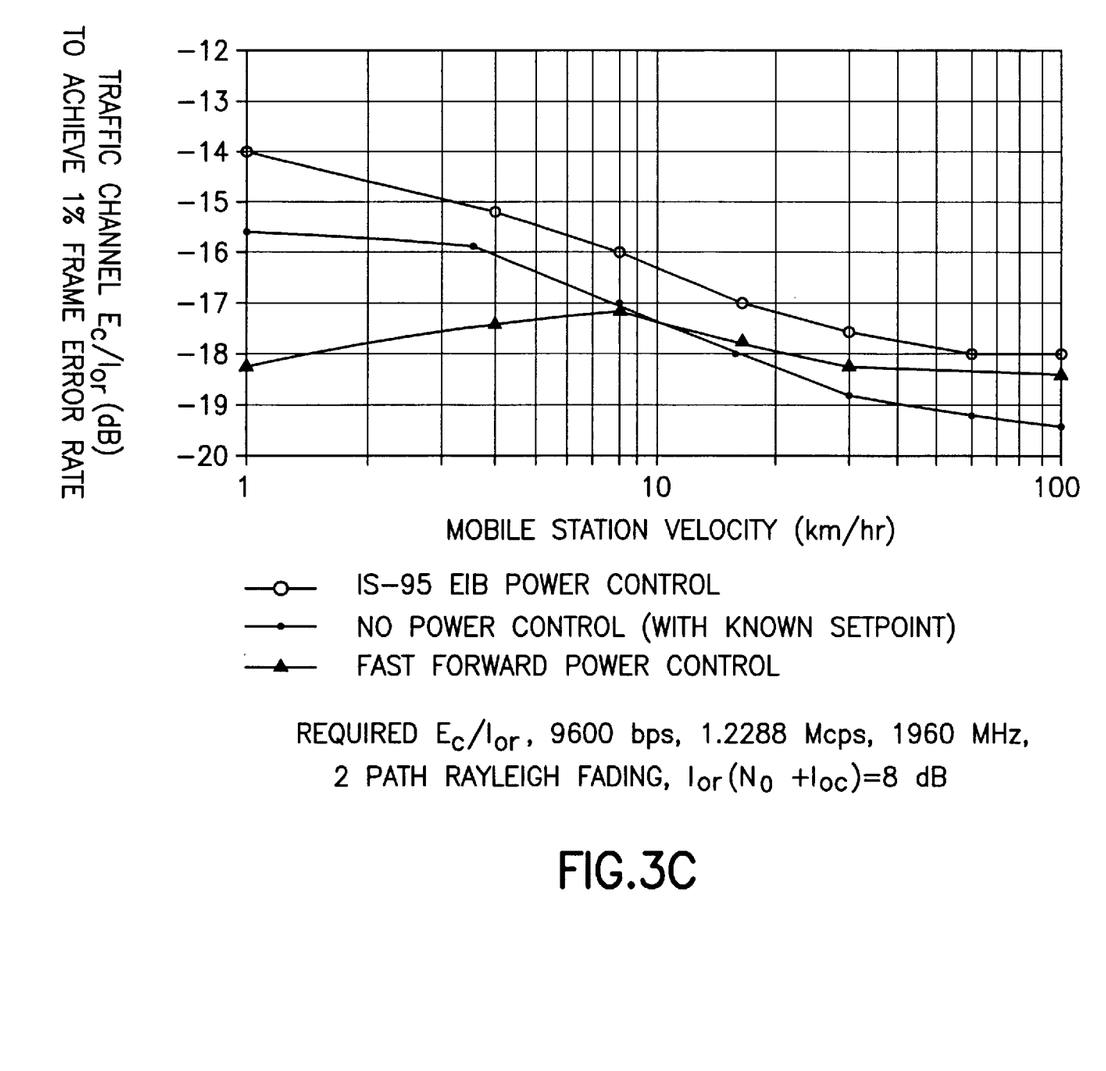
FIG. 3C graphically illustrates traffic channel $E_c/I_{or}$(dB) versus mobile station velocity.

In FIG. 3 of the paper by Tiedemann et al. (reproduced herein as FIG. 3C) the traffic channel $E_c/I_{or}$ (dB) to achieve a 1% Frame Error Rate is plotted versus mobile station velocity. As is illustrated in FIG. 3C, link performance is better with power control for a mobile station travelling at a low velocity than for a mobile station travelling at a high velocity, as compared to the case where there is no power control. A mobile station travelling at a high velocity is generally experiencing shifts in a carrier frequency due to the relative motion between the mobile station and the base station. This shifting in frequency is well known to those skilled in the art as the Doppler effect of wave propagation between non-stationary points. As a result, a mobile station travelling at a low velocity can be referred to as a mobile station in a low Doppler condition, and a mobile station travelling at a high velocity can be referred to as a mobile station in a high Doppler condition.

There are several possible reasons for the degradation of link performance in mobile stations moving at a high velocity (i.e. in a high Doppler condition), for example, a velocity greater than about 30 km/h for a carrier frequency of 2 GHz in a PCS band (actually about 1.86 GHz). These possible reasons include, for example, the fact that the channel is changing too fast for the mobile station to accurately estimate the channel response, and the fact that delays occur within the closed loop power control process. The delays in the closed loop power control process may be due to delays between the channel measurement performed at the mobile station and the actual change in power at the base station. Other delays may be experienced at the base station as the base station extracts and processes information from the channel. For example, the mobile station performs processing operations to determine whether or not the mobile station requires more or less power and then transmits a power control command on the reverse link to the base station. The base station decodes the command received over the reverse link and then applies the power control command to change the power of the traffic channel.

The gain due to closed loop power control, expressed as the ratio of the energy of an information bit ($E_b$) to the noise power spectrum density ($N_t$) or $E_b/N_t$, can be as large as 2–6 dB for low Doppler conditions (e.g., less than 50 Hz in the PCS band (2 GHz)) for mobile stations moving at a velocity of less than about 30 km/h, and as much as about 60 km/h in the cellular band (1 GHz, actually about 800–900 MHz). In high Doppler conditions (e.g., in the PCS band for mobile stations moving at a velocity above about 30 km/h, and over about 60 km/h in the cellular band), the closed loop power control results in degraded $E_b/N_t$ performance, with the degradation being as large as 1–2 dB.

It can thus be appreciated that it would be desirable to have a power control technique which combats the effects of fading in both the low and the high Doppler conditions, and which enables mobile stations to operate at power levels which are appropriate given the velocity of the mobile station.

OBJECTS AND ADVANTAGES OF THE INVENTION

It is thus a first object and advantage of this invention to provide a power control technique that overcomes the foregoing and other problems.

It is another object and advantage of this invention to provide a wireless telecommunications system employing a power control technique which, in response to a determined velocity of the mobile station, adjusts the power level of a transmitted communication channel.

It is a further object and advantage of this invention to provide an improved third generation, spread spectrum wireless telecommunications system employing a power control technique which, in response to a determined velocity of the mobile station, adjusts the power level of a transmitted communication channel.

Further objects and advantages of this invention will become more apparent from a consideration of the drawings and ensuing description.

SUMMARY OF THE INVENTION

The foregoing and other problems are overcome and the objects and advantages are realized by methods and apparatus in accordance with embodiments of this invention.

In a wireless telecommunications mobile station, which is bi-directionally coupled to a base station through a communication channel, the mobile station includes a device for receiving signals over the communication channel from the base station, power control circuitry for selectively deriving power control commands, and a device for transmitting the selectively derived power control commands to the base station. The power control circuitry provides, in cooperation with the base station, closed loop power control to the communication channel. The power control circuitry includes circuitry for selectively deriving power control commands based on one of first power control commands or second power control commands in response to a determined mobility of the mobile station relative to the base station. The determined mobility may be based on a measured Doppler shift in a received signal from the base station, such as a shift in a carrier frequency, and/or an estimated or inferred velocity that is derived from the Doppler shift. Also included is a device for selectively deriving the first power control commands from the communication channel and for deriving the second power control commands from one of default power control commands and modifications to the first power control commands. The first power control commands are used when the Doppler shift or the inferred velocity of the mobile station is less than a predetermined level. The second power control commands are used when the Doppler shift or the inferred velocity of the mobile station is greater than or equal to the predetermined level. In one embodiment, the predetermined level is a velocity threshold value of above about 30 km/h when operating in a frequency band of about 2 GHz, and over about 60 km/h when operating in a frequency band of about 1 GHz.

A method of operating a wireless telecommunications mobile station is also presented. The method includes steps of: (a) providing at least one base station bi-directionally coupled to the mobile station; (b) transmitting a communication channel between the base station and the mobile station; (c) determining a Doppler condition of the mobile station; (d) in response to the determined Doppler condition, selectively deriving power control commands based on one of first power control commands or second power control commands to provide closed loop power control to the communication channel in response to the Doppler condition of the mobile station; and (e) transmitting the selectively derived power control commands to the base station.

A wireless telecommunications base station is also presented. The base station is bi-directionally coupled to at least one mobile station through a communication channel. The base station includes a device for receiving power control signals over the communication channel from the mobile station, and power control circuitry for providing, in cooperation with the mobile station, closed loop power control to the communication channel. The power control circuitry includes circuitry for selectively deriving power control commands based on one of first power control commands or second power control commands in response to a velocity of the mobile station. In one embodiment, the circuitry for selectively deriving power control commands includes a device for estimating a Doppler condition of the mobile station, a device for inferring the velocity of the mobile station, and a device for selectively deriving the first power control commands from the received power control signals and for deriving the second power control commands from one of default power control commands and modifications to the first power control commands. The device for inferring the velocity may be responsive to at least one of a speed estimation algorithm, a signal strength measurement, or a received signal error rate -measurement, such as a bit error rate (BER), symbol error rate (SER), or frame error rate (FER).

Also presented is a method of operating a wireless telecommunications system. The method includes steps of: (a) providing at least one mobile station bi-directionally coupled to a base station; (b) transmitting a communication channel between the base station and the mobile station; (c) determining a Doppler condition of the mobile station; and (d) in response to the determined Doppler condition, selectively deriving power control commands based on one of first power control commands or second power control commands to provide closed loop power control to the communication channel in response to the Doppler condition of the mobile station.

BRIEF DESCRIPTION OF THE DRAWINGS

The above set forth and other features of the invention are made more apparent in the ensuing Detailed Description of the Invention when read in conjunction with the attached Drawings, wherein.

Identically labelled elements appearing in different ones of the above described figures refer to the same elements but may not be referenced in the description for all figures.

DETAILED DESCRIPTION OF THE INVENTION

Figure 1:
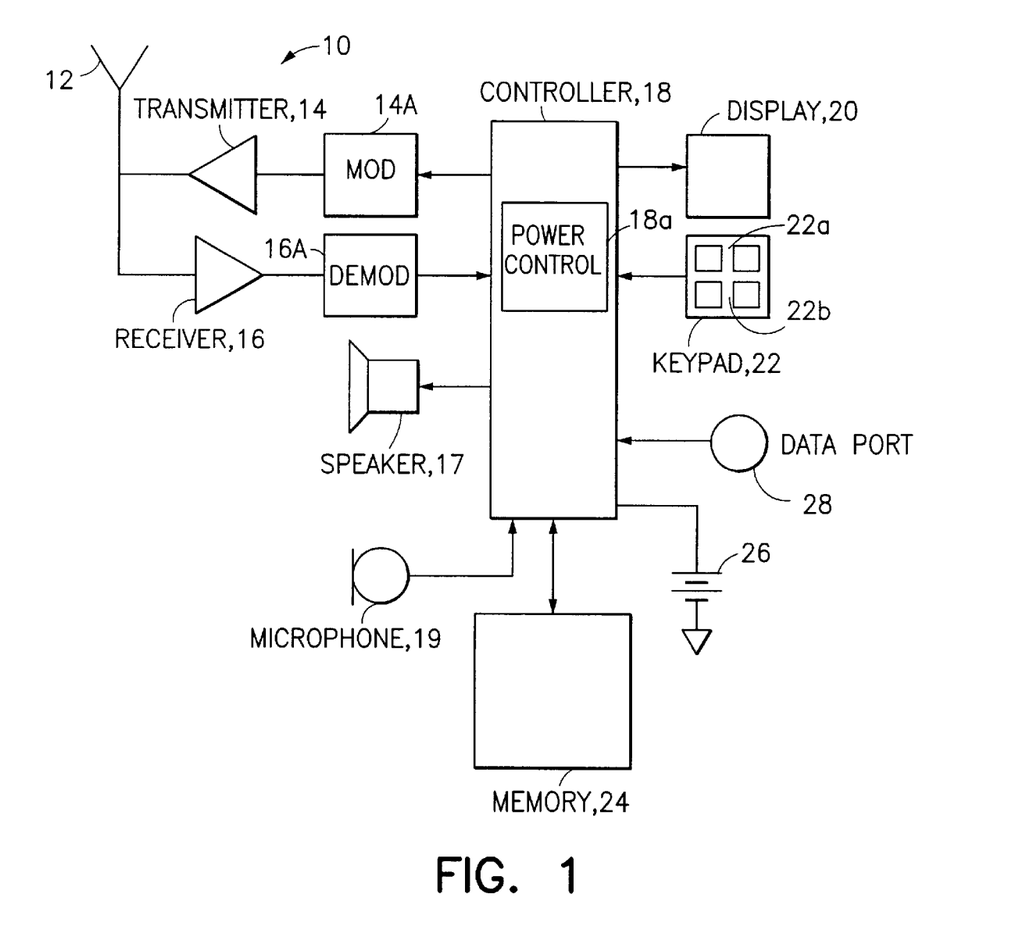
FIG. 1 is a block diagram of a CDMA mobile station that is constructed and operated in accordance with this invention.
Figure 2:
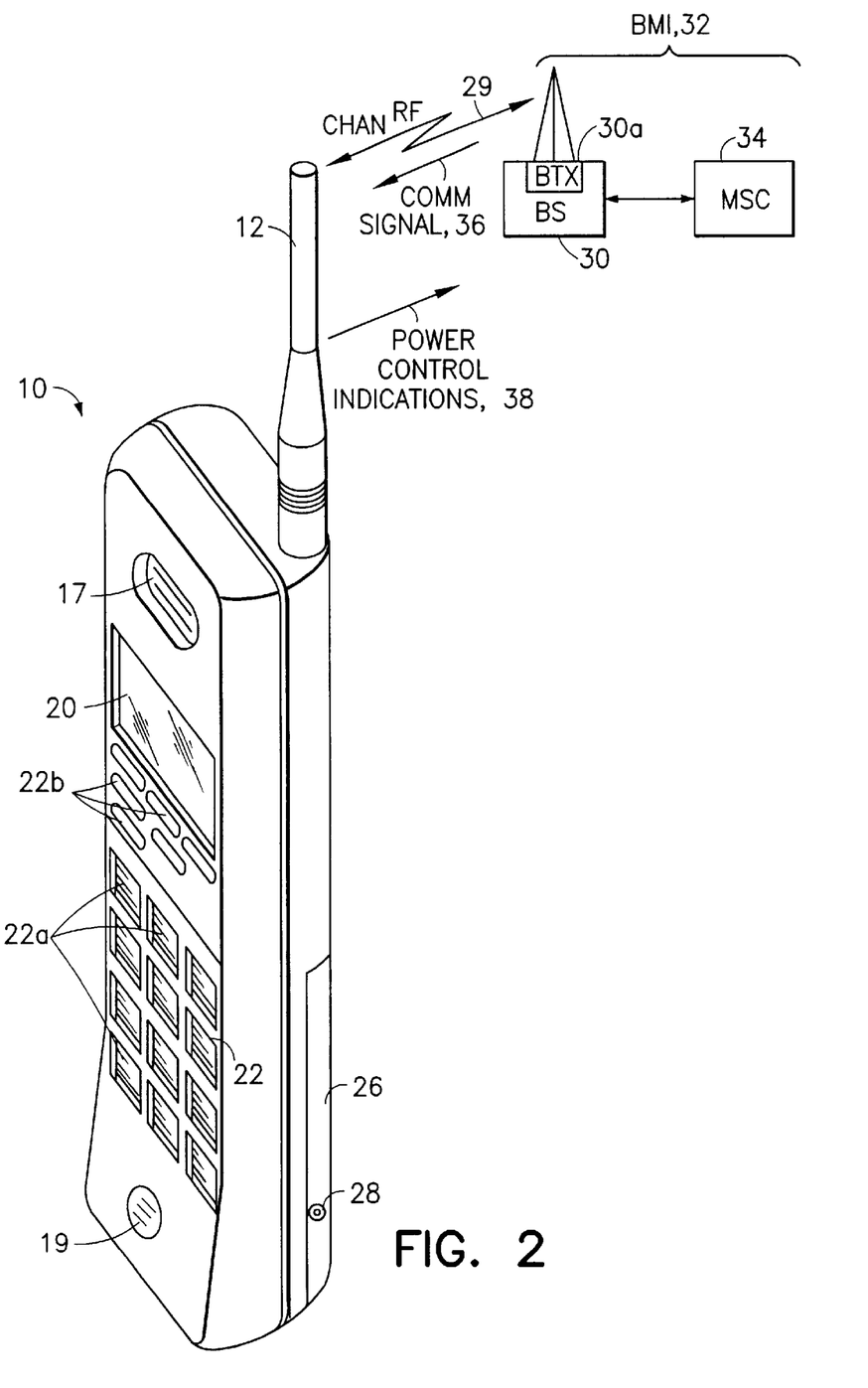
FIG. 2 is an elevational view of the mobile station shown in FIG. 1, and which further illustrates a CDMA communication system to which the mobile station is bi-directionally coupled through an RF channel.

Reference is made to FIGS. 1 and 2 for illustrating a wireless user terminal or mobile station (MS) 10, such as but not limited to a cellular radiotelephone or a personal communicator, that is suitable for practicing this invention. The mobile station 10 includes an antenna 12 for transmitting signals to and for receiving signals such as a communication signal 36 from a cell site or base station (BS) 30 over an RF channel 29. The base station 30 is a part of a cellular network comprising a Base Station/Mobile Switching Center/Interworking function (BMI) 32 that includes a mobile switching center (MSC) 34. The MSC 34 provides a connection to landline trunks when the mobile station 10 is involved in a call. The base station 30 includes a base station transmitter (BTX) 30a wherein resides embodiments of the circuitry for executing power control techniques of the present invention.

The mobile station includes a modulator (MOD) 14A, a transmitter 14, a receiver 16, a demodulator (DEMOD) 16A, and a control and processing unit, referred to as a controller 18, that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a wideband, spread spectrum, code division multiple access (WCDMA) air interface that is identical to or similar to the proposed third generation spread spectrum system discussed earlier. However, the teaching of this invention is not intended to be limited only to this specific type of system, or for use only with a IS-95 3G type of mobile station, or for use only in spread spectrum systems.

Of particular interest to this invention is a closed loop power control block 18a of the mobile station 10 that is used, in cooperation with the base station transmitter (BTX) 30a and corresponding closed loop power controller, to implement the teachings of this invention. Conventional open loop and outer loop power control functions (not shown) may typically also be present, but are not discussed herein.

It should be understood that, in one aspect of the present invention, the mobile station power control circuitry 18a is capable of deriving power control commands 38 from the received communication signal 36, and for transmitting the power control commands 38 back to the base station 30. For example, the mobile station demodulator 16A may be a rake receiver which includes a plurality of finger decorrelators for separately despreading a plurality of subchannels within the received communication signal 36 using a subchannel pseudonoise (PN) spreading code.

In one embodiment of the present invention the received communication signal 36 includes four subchannels; a pilot channel, a control channel, a fundamental channel and a supplemental channel (see, for example, the enhanced IS-95 uplink signal structure discussed at pages 926–927 in the above-identified paper by Tiedemann et al.). The pilot channel is separately despread by each of the plurality of finger decorrelators of the rake receiver using a PN code. In this way, the received signal timing, phase and level can be estimated. As a result, closed loop power control can be independent of the data rate being transmitted. That is, the power control commands 38 may be based on the signal to noise ratio (SNR) at the output of the rake receiver or on the amplitude or power of the signal from the rake receiver. The power control commands 38 can also be based on one or more of the power levels on each subchannel, symbol error rates of the data contained in each subchannel, and/or bit or frame error rates determined after decoding. It should be appreciated that various decorrelators and decoders are known in the art, and will not be discussed with any specificity herein.

Reference may be had to the following commonly assigned U.S. Patents for teaching various aspects of spread spectrum circuitry and methods: U.S. Pat. No. 5,440,597 issued Aug. 8, 1995 by S. Chung et al., entitled "Double Dwell Maximum Likelihood Acquisition System With Continuous Decision Making For CDMA And Direct Spread Spectrum System"; U.S. Pat. No. 5,566,201 issued Oct. 15, 1996 by K. Ostman, entitled "Digital AGC For A CDMA Radiotelephone"; U.S. Pat. No. 5,548,616 issued Aug. 20, 1996 by L. Mucke et al., entitled "Spread Spectrum Radiotelephone Having Adaptive Transmitter Gain Control"; and U.S. Pat. No. 5,491,718 issued Feb. 13, 1996 by A. Gould et al., entitled "CDMA Radiotelephone Having Optimized Slotted Mode And Long Code Operation". The disclosures of these commonly assigned U.S. Patents are incorporated by reference herein in their entireties to the extent that no conflict occurs with the teachings of this invention.

It should be understood that the controller 18 also includes the circuitry required for implementing the audio and logic functions of the mobile station. By example, the controller 18 may be comprised of a digital signal processor (DSP) device, a microprocessor or microcomputer unit (MCU), digital to analog converters, and other support circuits. The control and signal processing functions of the mobile station 10 are allocated between these devices according to their respective capabilities. In some embodiments all or some of the functions of the modulator 14A and demodulator 16A may also be included in the controller 18, specifically in the DSP portion thereof. A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station, as well as operating programs. As is discussed below, a portion of memory 24 stores variables used during power control operations of the present invention.

It should be understood that the mobile station 10 can be a vehicle mounted or a handheld device. It should further be appreciated that the mobile station 10 can be capable of operating with more than one air interface standard, modulation type, and access type.

It should also be realized that in other embodiments the mobile station 10 may function only as a data terminal, or at least one of transmitting or receiving packet data over the RF channel 29. The mobile station 10 which functions as a data terminal can include a data port 28 which is coupled to the controller 18. As a data terminal, certain of the user interface components described above may not be included.

FIG. 3A illustrates a power control technique for a CDMA communication system as is known in the prior art. A base station transmitter (BTX) 42 of a base station 40 of the CDMA communication system provides a communication signal 45 that is amplified by a variable gain amplifier 44. The output of the amplifier 44, i.e. the communication channel 45, is transmitted on a forward link, typically on an RF channel 46, to a selected one of a plurality of mobile stations, for example, a mobile station 48 operating within the cell served by the base station 40. Power control circuitry 50 of the mobile station 48 may detect fading in the signal received over the RF channel 46, and in response thereto, transmit power control commands 51 back to the base station 40 on a reverse link. For example, the power control commands 51 may be based on and include the signal to noise ratio (SNR) at the mobile station, the difference in the SNR of the signal power between an observed SNR and a target SNR, or simply repeated up-down power control commands. The base station 40 receives and processes the power control commands 51 to control the gain of the amplifier 44, thus providing a closed-loop power control function.

FIG. 3B illustrates, in greater detail, the prior art power control circuitry 50 of the mobile station 48. As shown in FIG. 3B, the mobile station 48 includes an antenna 52 which receives the communication signal 45 over the RF channel 46. The antenna 52 is coupled to a RF stage 54 which, as is known in the prior art, comprises amplifiers and downmixers for converting the received communication signal 45 to a baseband signal. Components of the baseband signal include, for example, in-phase and quadrature components are passed to a processor within the mobile station power control circuitry 50. Typically, the processor is a digital signal processor (DSP) 56 which calculates a power measurement of the received communication signal 45 based upon the components of the baseband signal. Alternatively, the DSP 56 may use, for example, the received signal strength indication (RSSI) of the communication signal 45 to calculate a power measurement. Once calculated, the power measurements are used by the DSP 56 to derive power control commands 51 that are transmitted to the base station 40.

As was noted above, mobile stations employ power control algorithms to determine the power levels required for effective operation. The inventors have noted that in high Doppler conditions (e.g., in the PCS band (2 GHz) for mobile stations having a velocity above about 30 km/h, and over about 60 km/h in the cellular band (1 GHz)), closed loop power control results in degraded $E_b/N_t$ performance. The inventors have realized that, by accounting for the Doppler condition within the power control analysis, a mobile station can operate more effectively.

Figure 4:
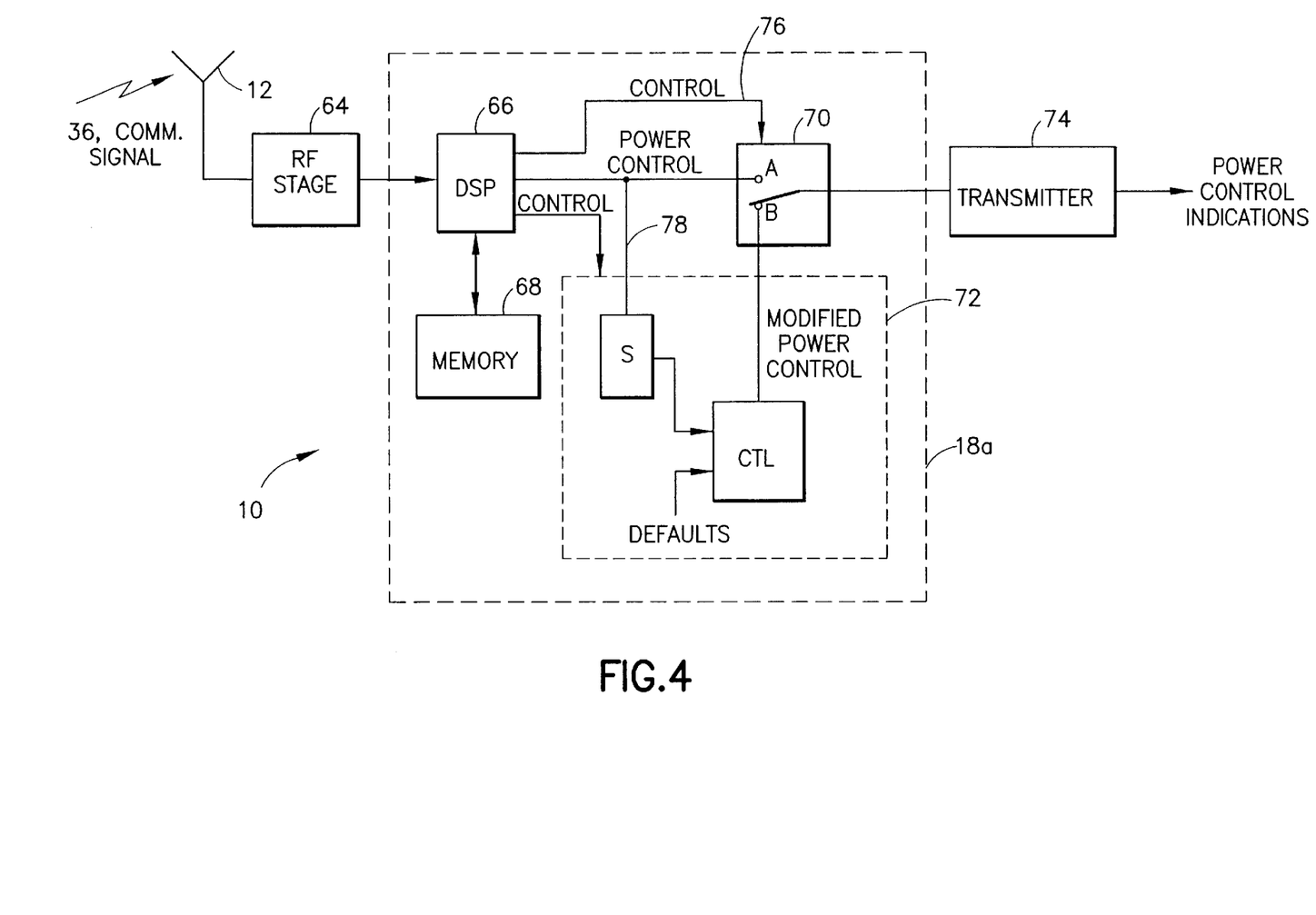
FIG. 4 is a schematic block diagram of power control in a mobile station of a CDMA communication system operating in accordance with the present invention.

In accordance with one aspect of the present invention, and as is shown in FIG. 4, the power control circuitry 18a of the mobile station 10 (FIG. 1) includes the ability to selectively modify the derivation of power control commands in response to an estimate of the mobile station's velocity, based on an estimation or determination of the Doppler condition of the mobile station. As discussed above, since the base station 30 is fixed, any Doppler shift would be caused by the motion of the mobile station 10, and the amount of Doppler shift is indicative of the mobile station's velocity. Therefore, by selectively disabling the derivation of power control commands based upon the received signal when, for example, the mobile station is moving at a velocity that exceeds a "high" velocity threshold (as determined from the Doppler condition of the mobile station), then link performance is improved.

It should be noted that having determined the Doppler condition of the mobile station 10 (e.g., high or low), an estimation of the actual velocity of the mobile station may be optional.

As shown in FIG. 4, the mobile station 10 receives the communication signal 36, for example, a pilot signal from the serving base station, over the RF channel 29 at the antenna 12. The antenna 12 is coupled to RF stage 64 which converts the received communication signal 36 to a baseband signal. Components of the baseband signal, e.g. in-phase and quadrature components, are passed to a processor, for example, a digital signal processor (DSP) 66 within the mobile station's power control circuitry 18a.

As discussed above, the mobile station 10 may include a rake receiver having a plurality of finger decorrelators for separately despreading a plurality of subchannels within the received communication signal 36 using a pseudonoise (PN) spreading code. In one embodiment, a pilot channel is separately despread in each finger using a pseudonoise (PN) spreading code. In accordance with the present invention, the DSP 66 applies an estimation algorithm to each finger to determine the Doppler condition and, optionally, to estimate the velocity of the mobile station 10. For example, the DSP 66 may estimate the Doppler condition of the mobile station 10 in accordance with one of a zero crossing rate, a level crossing rate, or a covariance function estimation routine. Once the Doppler condition of the mobile station has been estimated, the velocity of the mobile station 10 can be inferred such that the power control circuitry 18a may be utilized to by-pass or modify the derivation of power control commands to improve link performance.

Figure 5A:
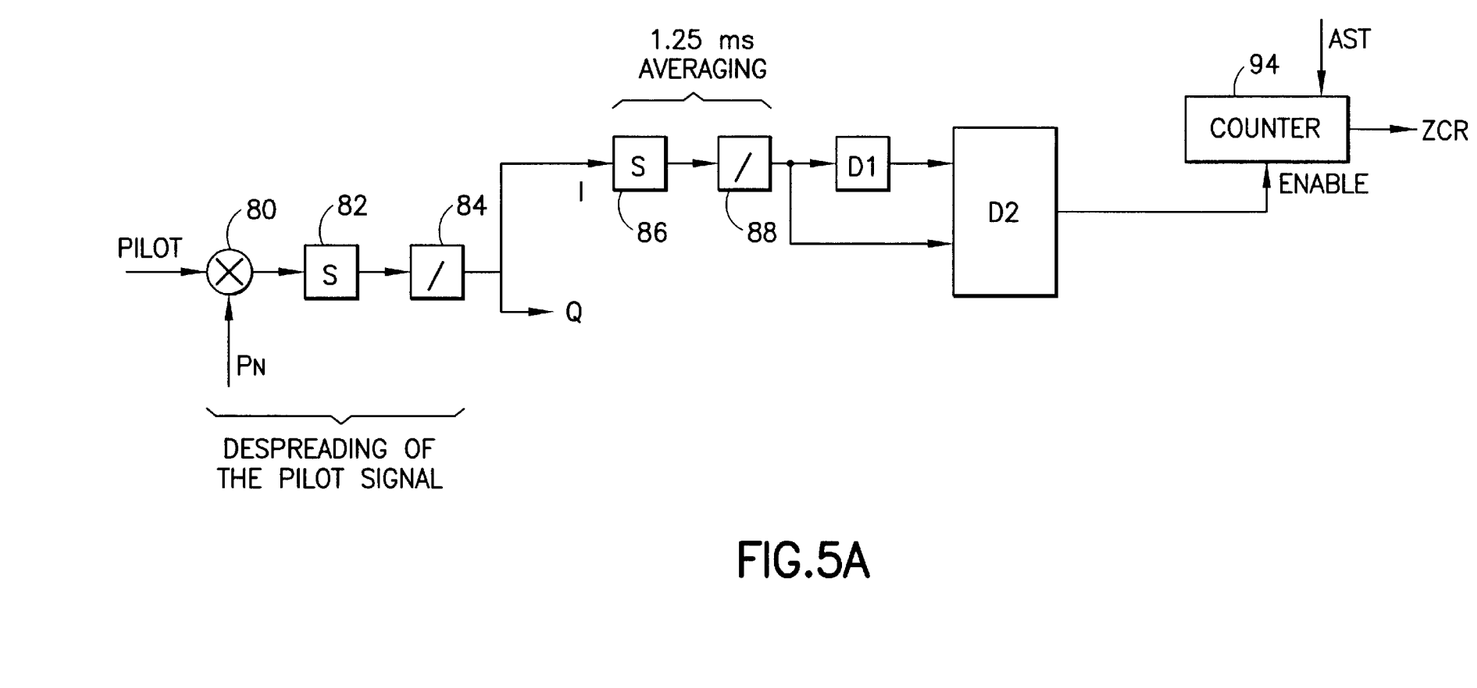
FIGS. 5A–5C are schematic block diagrams of power control circuitry in the mobile station of FIG. 4 for calculating a velocity of the mobile station, in accordance with the present invention.

FIG. 5A is a block diagram which illustrates an exemplary embodiment of circuitry to implement the zero crossing rate method (for each finger) to determine the Doppler condition of the mobile station 10 and, thus, the estimated or inferred velocity of the mobile station. As is shown generally in FIG. 5A, the zero crossing rate circuitry includes circuits 80, 82 and 84 for demodulating or despreading the received pilot signal by correlating the signal with one of a unique code, referred to as a pseudo-noise (PN) code, corresponding to the mobile station 10. One of the I or the Q components of the received pilot signal is processed by the power control circuitry of the mobile station 10. For example, the I component of the received pilot signal is averaged (block 86 and 88) over the 1.25 ms power control frame period. The averaged signal is passed to decision logic circuits (blocks D1 and D2) and a counter (block 94) wherein the zero crossing rate algorithm is applied and the number of occurrences in which the averaged signal crosses a zero level threshold in unit time is counted. A table look-up process, or a direct calculation, is performed using a ZCR signal output by the counter 94 to determine the Doppler frequency ($f_d$) according to a suitable technique (e.g., by dividing the ZCR signal by a value indicative of a root mean square level). If the table look-up procedure is employed the table can be stored in the memory 24 of FIG. 1.

In the level crossing rate routine, the signal envelope of the received communication signal is evaluated and an estimate is calculated corresponding to the number of occurrences in which the signal envelope crosses a predetermined threshold level, in a positive direction from below to above the level, in unit time. The level crossing rate technique may be expressed in accordance with the following:

$$LCR = \sqrt{\pi} * \exp\left(\frac{-\lambda^2}{2}\right)\lambda \qquad (1)$$

where $\lambda$ is the predetermined threshold level, for example the square root of 2.

Figure 5B:
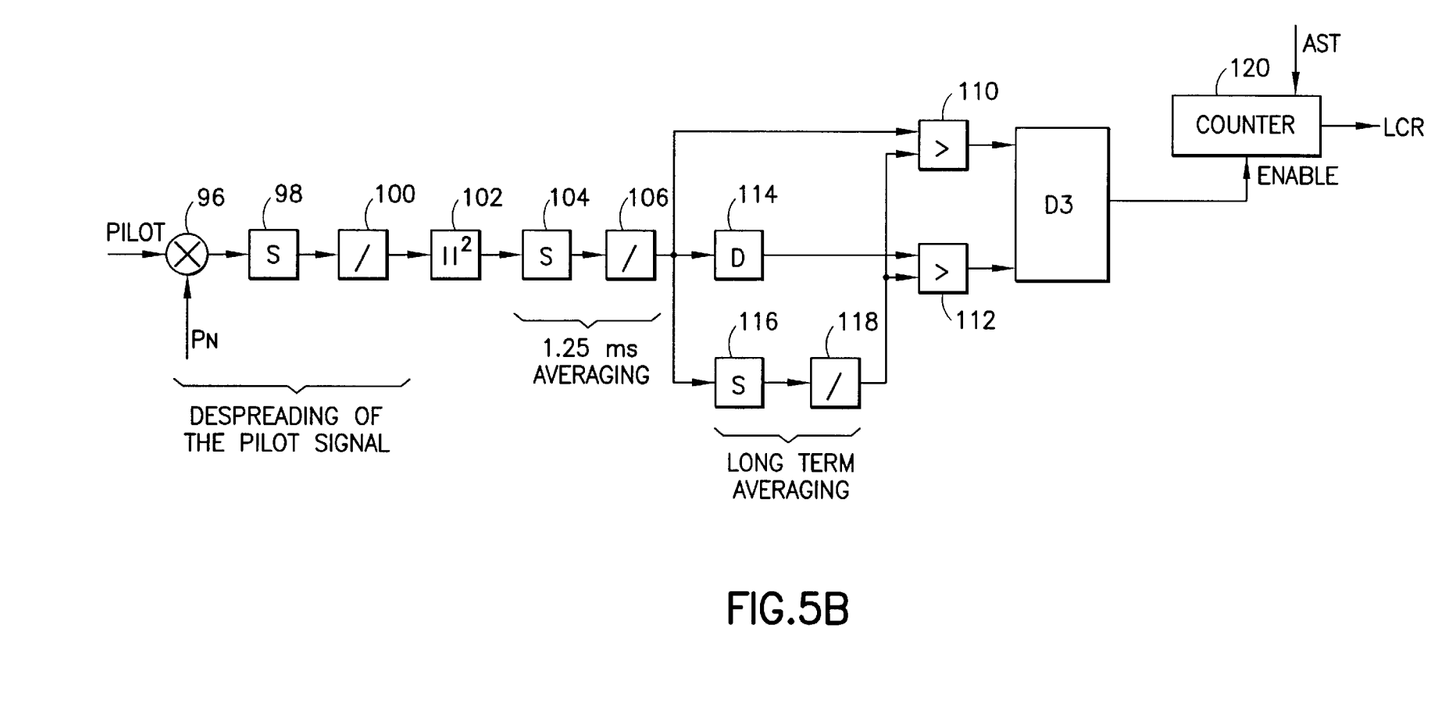

FIG. 5B is a block diagram which illustrates an exemplary embodiment of circuitry to implement the level crossing rate method (for one finger) to determine the velocity of the mobile station 10 and, thus, the Doppler condition of the mobile station 10. In FIG. 5B, the level crossing rate circuitry includes circuits 96, 98 and 100 for despreading the received pilot signal by correlating the signal with the PN code which corresponds to the mobile station 10. The despread pilot signal is passed to circuitry (block 102) where an envelope of the signal is formed.

The signal envelope is averaged (blocks 104 and 106) over the 1.25 ms power control frame period. The averaged signal is passed to a decision logic circuit (block D3) over three paths. In a first path, the averaged signal envelope is passed to a first input of a first comparator 110. In a second path, the averaged signal envelope is passed to a first input of a second comparator 112 through a delay (D) 114. In a third path, the averaged signal envelope is averaged by long term averaging circuits (blocks 116 and 118). The long term averaged signal is passed to second inputs of the first comparator 110 and the second comparator 112 wherein the signals from the three signal paths are compared. An output of the first comparator 110 and of the second comparator 112 are passed to the decision logic circuit (block D3) and a counter (block 120) wherein the level crossing rate algorithm is applied and the number of occurrences in which the signal envelope crosses the predetermined threshold level in unit time is estimated. The output of the counter 120, i.e. an LCR value, is determined in accordance with Equation 1.

In the covariance function estimation routine the amplitude of the received communication signal is sampled at a fixed sampling rate. The difference between successively sampled amplitudes of the received communication signal is monitored. It has been observed that as the Doppler frequency increases, the difference in successive samples also increases. Thus, if the received communication signal is represented as x(t), the covariance function estimation technique may be expressed in accordance with the following:

$$V = \frac{1}{N}\sum_{i=1}^{N}(y(i+1) - y(i))^2 \qquad (2)$$

where: y(i)=20 log 10(x(i)).

The covariance function estimation may be expressed in terms of the Doppler frequency ($f_d$) by substituting for the upper bound of Equation 2 and then using a series of approximation for the Bessel function such that Equation 2 is expressed as:

$$f_d = \frac{1}{\pi\tau}\sqrt{\frac{V}{124.1}} \qquad (3)$$

where: V is the velocity of the mobile station; and $\tau$ is the sampling duration which under IS-95 3G is, for example, 1.25 ms.

Alternatively, if the actual covariance function is calculated and then approximated using linear and parabolic curves, Equation 2 may be expressed as:

$$f_d = 13.66\sqrt{V}, \text{ if } V<6 \qquad (4)$$

and $$f_d = 3.0585V + 17.89 \text{ otherwise.} \qquad (5)$$

It is noted that by taking the logarithm, the local signal mean need not be estimated.

Figure 5C:
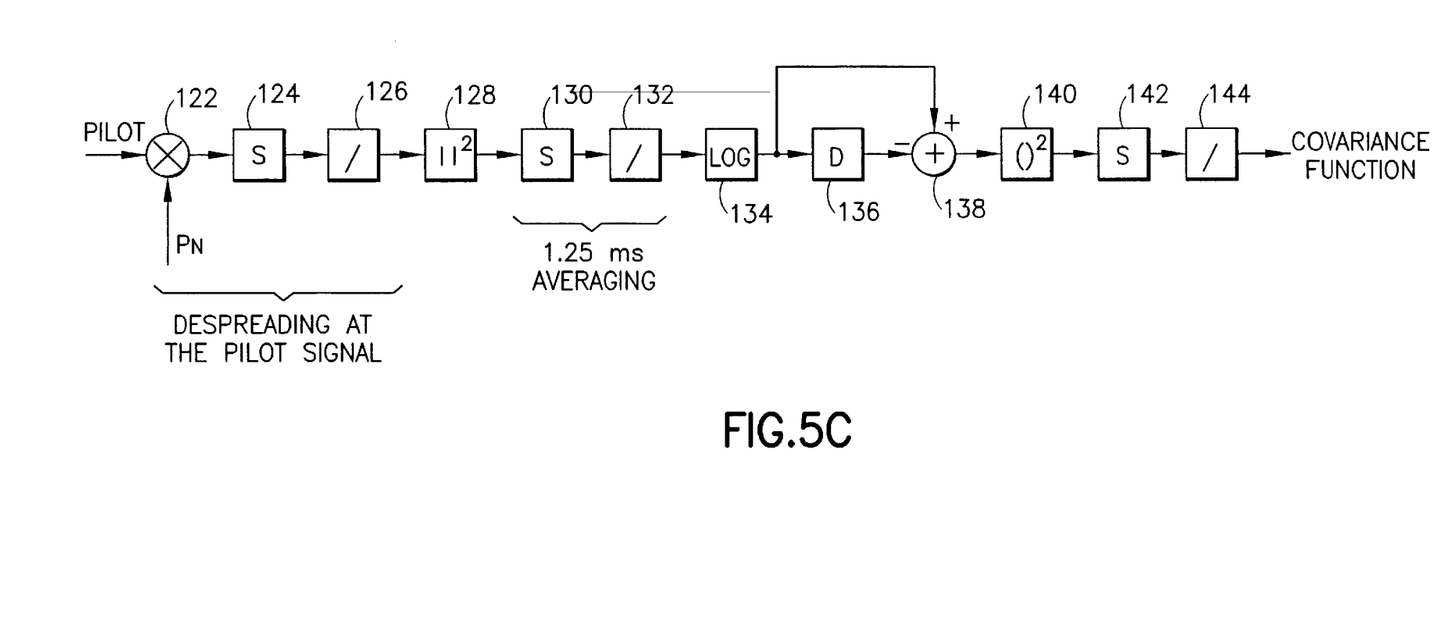

FIG. 5C is a block diagram which illustrates an exemplary embodiment of circuitry to implement the covariance function estimation routine (for one finger) to determine the velocity of the mobile station 10 and, thus, determining the Doppler condition of the mobile station 10. In FIG. 5C, the covariance function circuitry includes circuits 122, 124 and 126 for despreading the received pilot signal (as described above). The despread pilot signal is passed to circuitry (block 128) where an envelope of the signal is formed. The signal envelope is averaged (blocks 130 and 132) over the 1.25 ms power control frame period. The averaged signal is passed to approximation circuits (blocks 134 and 136) where the signal envelope is approximated using, for example, logarithmic functions. The approximations of the signal envelope, i.e. the outputs of blocks 134 and 136, are summed (block 138) and the summed approximation of the signal envelope is passed to circuits (blocks 140, 142 and 144) wherein the covariance function according to Equation 3 is calculated. A look-up process, or a direct calculation, is then performed using the covariance function to determine the Doppler frequency $f_d$ according to Equation 3.

As can be appreciated, the DSP 66 may store intermediate values for the components of the equations outlined above in a local memory 68 (FIG. 4) that may be a portion of, for example, the memory 24 (FIG. 1).

Figure 6:
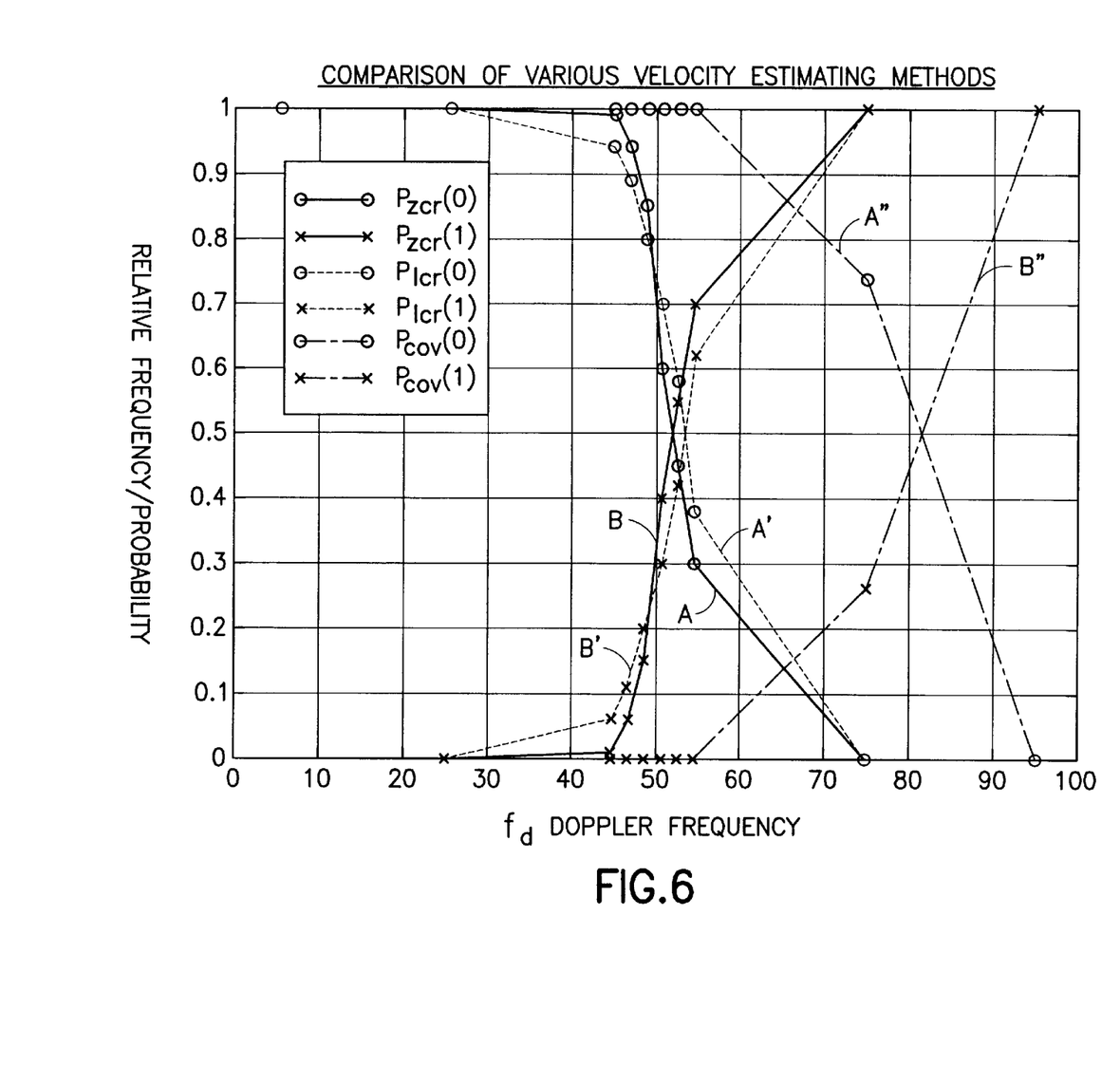
FIG. 6 graphically illustrates a relative frequency/probability versus Doppler frequency for various velocity estimation routines performed in accordance with the present invention.

In FIG. 6 relative frequency/probability comparisons determined according to the above described estimation routines are plotted. That is, FIG. 6 graphically illustrates two traces for each of the estimation routines. A first trace, trace A for the zero crossing rate, trace A' for the level crossing rate, and trace A″ for the covariance function estimation routine, plot a relative frequency/probability with which a detected Doppler frequency is above about 50 Hz. A second trace, trace B for the zero crossing rate, trace B′ for the level crossing rate, and trace B″ for the covariance function estimation routine, plot a relative frequency/probability with which a detected Doppler frequency is below about 50 Hz. As is shown in FIG. 6 the zero crossing rate method has a sharp cutoff around 50 Hz, while the covariance function method may require some bias correction prior to use.

Referring again to FIG. 4, once the DSP 66 has estimated or inferred the velocity of the mobile station 10 by utilizing, for example, one of the above described speed estimation routines, the velocity of the mobile station 10 is compared to a predetermined velocity value, or to a range of values. That is, the estimated velocity may be compared to, for example, a velocity threshold value of, for example, above about 30 km/h in the PCS band (2 GHz), and over about 60 km/h in the cellular band (1 GHz). This velocity threshold may be also taken to represent the transition to a high Doppler condition of the mobile station. If the estimated velocity is less than the velocity threshold value, then the mobile station 10 is assumed to be either stationary or moving slowly, i.e. the mobile station 10 is in the low Doppler condition. As described above, when the mobile station 10 is stationary or moving at low velocity link performance has been found to be within acceptable levels. Thus, power control commands derived from the received communication signal 36 are also acceptable. Once the DSP 66 has derived the power control commands, the commands may be transmitted to the base station 30.

Alternatively, the foregoing determinations may be made using only the derived Doppler and comparing same to the Doppler threshold of, for example, 50 Hz.

In one embodiment, the power control commands may include an indication of the velocity or Doppler condition of the mobile station 10, which the base station 30 then uses to selectively by-pass or modify the power control commands transmitted by the mobile station 10.

In accordance with the present invention, and referring to FIG. 4, when the estimated velocity or Doppler of the mobile station is less than the threshold value, a switch 70 is put in a position "A". In this configuration, power control commands derived from the received signal 36 are transmitted to the base station 30. That is, a control signal 76 from the DSP 66 toggles the switch 70 into position A to causes the power control commands 38 derived by evaluating the received signal 36 to be transmitted to the base station 30 by a transmitter 74. The power control commands 38 are transmitted from the transmitter 74 to the base station 30 within the closed loop power control operations described above.

On the other hand, if the estimated velocity or Doppler of the mobile station 10 is greater than or equal to the threshold value, then the mobile station 10 is assumed to be moving rapidly relative to the base station 30. That is, the mobile station is assumed to be operating under high Doppler conditions. As a result of this determination, the control signal 76 toggles the switch 70 into a position "B". In the position B, the power control commands derived directly from the received communication signal 36 are disabled or ignored.

FIG. 4 also illustrates an embodiment of the present invention in which a modified power control block 72 is enabled when the switch 70 is toggled in the position B. The modified power control block 72 allows the mobile station 10 to send default or modified power control commands to the base station. For example, the default power control commands can be repeated power up, power down, power up, power down, etc. power control commands sent to the base station transceiver 30a via the transmitter 74. The repeated power up/power down power control commands will tend to maintain the current power level of the base station 30 at about the same level.

Alternatively, the modified power control block 72 averages over time power control commands received from the DSP 66 over a signal path 78 such that during an integration period power control can be disabled and, at the end of the integration period, the power control commands can be enabled. For example, the integration period can be a frame period, or multiple frame periods, during which time the power control commands from the DSP 66 are disabled. At the end of the integration period the power control commands from the DSP 66 are enabled to continue the closed loop power control function. In one embodiment, the integration period can be a period in which the mobile station is operating in a high Doppler condition.

It should be appreciated that while shown as separate logic blocks in FIG. 4, it is within the scope of this invention for the switch 70 and modified power control block 72 to be combined within the DSP 66 as circuit elements thereof or, alternatively, to be software routines employed therein. As such, the above described features of the present invention are not intended to limit the application of this invention to any one particular technical embodiment. In this regard, the velocity threshold value may be evaluated before the power control commands are derived. Thus, if the estimated velocity exceeds the velocity threshold value, then power control commands are not first calculated from the received signal and then ignored. Instead, the power control calculations are immediately derived from the modified process when, for example, the default power control values are transmitted to the base station.

It should also be appreciated that while the determination of the velocity and/or the Doppler condition of the mobile station 10 is discussed above as being performed within the power control circuitry 18a of the mobile station 10, it is within the scope of this invention for the power control circuitry of the base station 30 to determine the velocity and/or the Doppler condition of the mobile station 10. For example, it is within the scope of this invention for the power control commands 38 to include the variables employed by the zero crossing rate, the level crossing rate, and the covariance function estimation routines. As a result, the base station 30 may exercise one of the speed estimation routines to determine the Doppler condition of the mobile station, and from the determined Doppler condition, determine or infer the velocity of the mobile station. On the other hand, the base station 30 may include circuitry to independently calculate the velocity and/or Doppler condition of the mobile station 10 by using the mobile station transmitted pilot signal and other factors such as, for example, the strength of a signal received on the reverse link or a received signal error rate measurement, such as a bit error rate (BER), symbol error rate (SER), or frame error rate (FER). If a high velocity (i.e., a high Doppler condition) is indicated, the base station 30 may assume that any power control commands received from the mobile station 10 are inaccurate and, thus, should be ignored or possibly modified before use.

Alternatively, it is within the scope of the present invention for the power control commands 38 to include, for example, signaling by which the mobile station 10 informs the base station 30 of the velocity of the mobile station. Once so informed, the base station 30 may be operable to derive power control commands utilizing the velocity and the determined Doppler condition of the mobile station 10. In this regard, for example, the mobile station 10 may receive an input from an external device such as, for example, an odometer, wherein a velocity of the mobile station is not estimated but rather measured by the external device and passed back to the base station 30 through the power control commands 38. Also, when the mobile station 10 derives the power control commands the velocity from the external device can be utilized.

Figure 7:
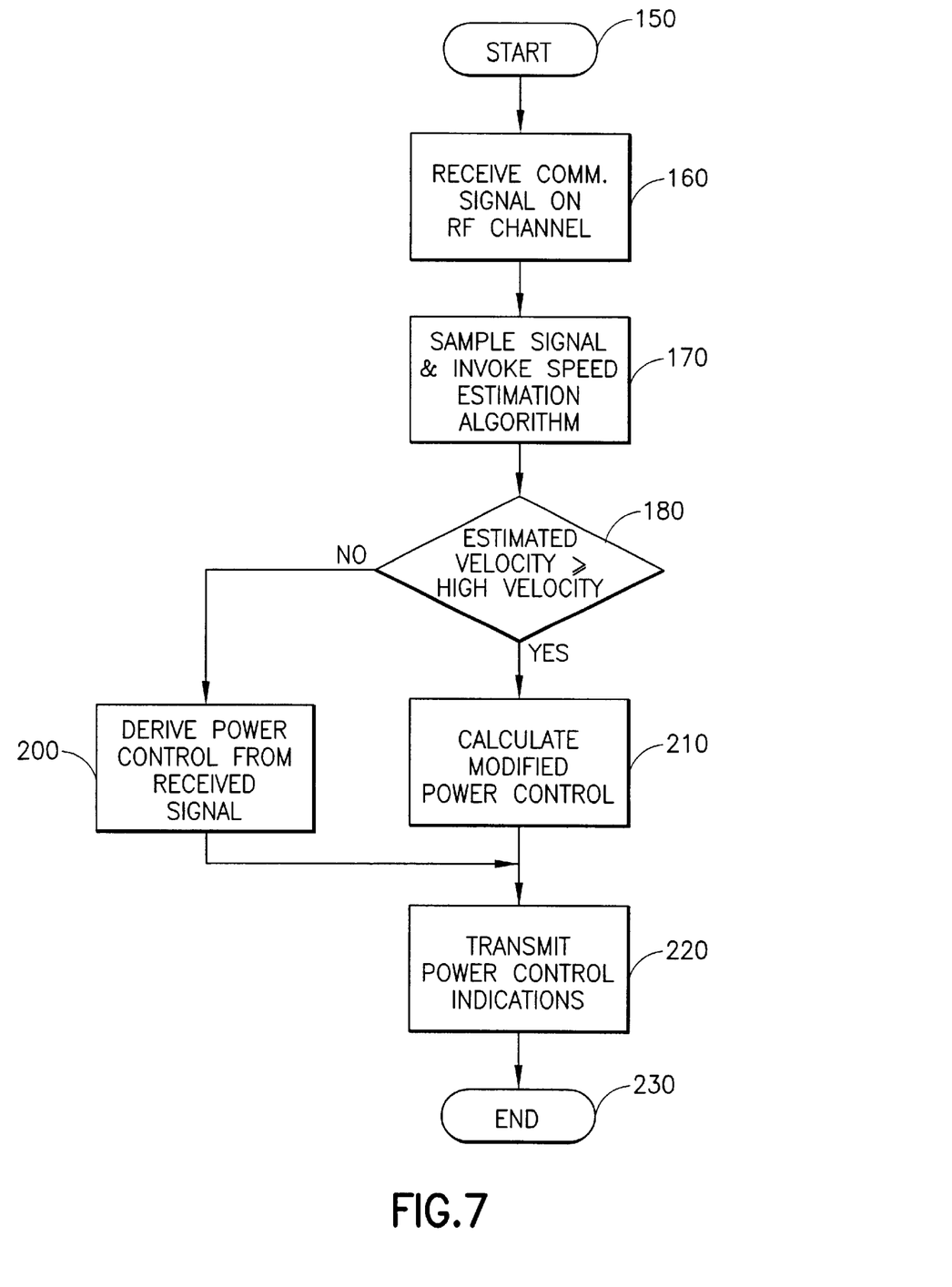
FIG. 7 is a flow chart which illustrates an exemplary method of performing power control in accordance with the present invention.

In FIG. 7, an exemplary embodiment of a power control technique performed in accordance with the present invention is presented. The power control process begins at Block 150. At Block 160, the communication signal .36 is received at the mobile station 10 over the RF channel 29. The mobile station 10 converts the received communication signal 36 to a baseband signal. The baseband signal is then sampled, an estimation algorithm is invoked at Block 170, and the Doppler condition of the mobile station is estimated or inferred. The estimation algorithm determines an estimated Doppler shift in the received signal by employing, preferably, one of the zero crossing rate, the level crossing rate, or the covariance function estimation routines described in detail above.

At Block 180 the method can derive the velocity of the mobile station 10, as discussed above, and then compare the velocity to a predetermined threshold value. For example, the threshold value may represent the velocity value of the mobile station 10 of, for example, above about 30 km/h in the PCS band (2 GHz) and over about 60 km/h in the cellular band (1 GHz). If the estimated velocity is less than the velocity threshold value then the mobile station 10 is operating in a low Doppler condition and control passes along a "NO" path to Block 200 where the derivation of the power control commands 38 is based upon the received signal 36. However, if the estimated velocity is greater than or equal to the velocity threshold value then the mobile station 10 is operating in a high Doppler condition and control passes along a "YES" path to Block 210. At Block 210 the modified power control process is invoked wherein the power control commands 38 are based upon a default criterion or a modification of power control commands based upon the received signal 36. For example, the default criterion may set the power control commands to repeated power up, power down, power up, power down, etc. values. Alternatively, and after having determined an amount of Doppler shift experienced by the received signal, the Doppler shift itself may be compared in Block 180 to a suitable threshold value (e.g., 50 Hz when operating in the PCS band), without also estimating the velocity of the mobile station 10, and subsequent processing is then based on the Doppler comparison.

At the conclusion of processing at either blocks 200 or 210, control then passes to block 220 where power control commands, i.e. the determined power control commands 38, are transmitted to the base station transceiver 30a. The power control process ends at block 230.

Although described in the context of preferred embodiments, it should be realized that a number of modifications to these teachings may occur to one skilled in the art. By example, and as discussed above, the teachings of this invention are not intended to be limited to any specific signal processing protocol or telecommunication standard. In particular, the mobile station and base station which operate in accordance with the present invention may be operating with more than one air interface standard, modulation type, and access type.

Furthermore, the method may employ more than one threshold, e.g., two thresholds for establishing one of a low Doppler condition, an intermediate Doppler condition, and a high Doppler condition, and subsequent power control processing can be directed accordingly.

It should also be realized that two or more fingers of the mobile station receiver could be used for receiving and tracking the same base station signal that arrives on a different path (i.e., multipath). In this case it may well be true that, based on the direction of arrival of the multipath signals, one finger will indicate a low Doppler condition while another finger, at the same time, may indicate a high Doppler condition. This condition can be accommodated by a number of techniques in the mobile station, such as by averaging the two or more measured Doppler shifts and basing power control processing on the average Doppler shift (or the corresponding average velocity), or by basing further processing on the highest measured Doppler shift, or on the lowest measured Doppler shift.

Thus, while the invention has been particularly shown and described with respect to preferred embodiments thereof, it will be understood by those skilled in the art that changes in form and details may be made therein without departing from the scope and spirit of the invention.

What is claimed is:

1. A wireless telecommunications base station comprising a transceiver for being bidirectionally coupled to at least one mobile station through a radio communication channel, the base station further comprising:

means for receiving power control signals over the radio communication channel from the mobile station; and power circuitry for a in cooperation with the mobile station, closed loop power control to the radio communication channel, wherein the power control circuitry comprises circuitry for determining a mobility of the mobile station and for selectively deriving power control commands based on one of first power control commands or second power control commands in response to the determined mobility of the mobile station, said second power control commands including open loop power control commands;

means for determining a Doppler condition of the mobile station; and wherein said first power control commands are derived when said mobile station is in a low Doppler condition, and wherein said second power control commands are derived when said mobile station is in a high Doppler condition.

2. A wireless telecommunications base station as in claim 1, wherein the circuitry is comprised of:

means for determining a Doppler condition of the mobile station;

means for optionally determining a velocity of the mobile station from the determined Doppler condition; and means for selectively deriving the first power control commands from the received power control signals and for deriving the second power control commands from one of default power control commands or modifications to the first power control commands.

3. A wireless telecommunications base station as in claim 1, wherein the circuitry is comprised of means for extracting at least one of a mobile station determined Doppler condition or velocity from the received power control signals.

4. A wireless telecommunications base station as in claim 1, wherein the circuitry is responsive to at least one of an output of a speed estimation algorithm, a received signal strength measurement, or a received signal error rate measurement.

5. A wireless telecommunications base station as in claim 4, wherein the received power control signals include speed estimation variables for use in the speed estimation algorithm.

6. A method for operating a wireless telecommunications base station, comprising steps of:
   receiving power control signals over a radio communication channel from the mobile station;
   determining a mobility of the mobile station at least in part from the received power control signals, including determining a Doppler condition of the mobile station;
   selectively deriving power control commands based on one of first power control commands or second power control commands in response to the determined mobility of the mobile station, said second power control commands including open loop power control commands; and
   deriving said first power control commands when said mobile station is in a low Doppler condition, and deriving said second power control commands when said mobile station is in a high Doppler condition;
   transmitting the power control commands to the radio communication channel.

7. A method as in claim 6, wherein the determining step is comprised of:
   determining a Doppler condition of the mobile station; and
   optionally determining a velocity of the mobile station from the determined Doppler condition;
      wherein the step of selectively deriving operates to derive the first power control commands from the received power control signals and the second power control commands from one of default power control commands or modifications to the first power control commands.

8. A method as in claim 6, wherein the determining step is comprised of means for extracting at least one of a mobile station determined Doppler condition or velocity from the received power control signals.

9. A method as in claim 6, wherein the determining step is responsive to at least one of an output of a speed estimation algorithm, a received signal strength measurement, or a received signal error rate measurement.

10. A method as in claim 9, wherein the received power control signals include speed estimation variables for use in the speed estimation algorithm.

11. A method of operating a wireless telecommunications system, the method comprising steps of:
   transmitting power control signals over a radio communication channel from a mobile station to a fixed station;
   receiving the power control signals from the radio communication channel at the fixed station; and
   adjusting a transmitted power in accordance with the received power control signals; wherein
   the step of transmitting includes a preliminary step of determining an amount of Doppler shift of a carrier signal that is transmitted from the base station to the mobile station; and
   selectively deriving power control commands based on one of first power control commands or second power control commands in response to the determined Doppler shift, said second power control commands including open loop power control commands; and
   the step of selectively deriving power control commands includes deriving said first power control commands when said mobile station is in a low Doppler condition, and deriving said second power control commands when said mobile station is in a high Doppler condition.

12. A method of operating a wireless telecommunications system, the method comprising steps of:
   transmitting power control signals over a radio communication channel from a mobile station to a fixed station;
   receiving the power control signals from the radio communication channel at the fixed station; and
   adjusting a transmitted power in accordance with the received power control signals; wherein
   the step of transmitting includes preliminary steps of determining an amount of Doppler shift of a carrier signal that is transmitted from the fixed station to the mobile station; and estimating a velocity of the mobile station, relative to the fixed station, from the determined amount of Doppler shift; and
   selectively deriving power control commands based on one of first power control commands or second power control commands in response to the determined Doppler shift, said second power control commands including open loop power control commands; and
   the step of selectively deriving power control commands includes deriving said first power control commands when said mobile station is in a low Doppler condition, and deriving said second power control commands when said mobile station is in a high Doppler condition.

13. A wireless telecommunications mobile station, said mobile station comprising a transceiver for being bidirectionally coupled to a base station through a radio communication channel, the mobile station further comprising:
   receiver circuitry for receiving signals over the radio communication channel from the base station;
   power control circuitry for determining a mobility of said mobile station relative to said base station and for providing, in cooperation with said base station, closed loop power control to the radio communication channel, said power control circuitry comprising:
      means for determining a Doppler condition of said mobile station,
      circuitry for selectively deriving power control commands based on one of first power control commands or second power control commands in response to the determined mobility of said mobile station relative to said base station, said second power control commands including open loop power control commands,
      means, responsive to said determined Doppler condition, for selectively deriving said first power control commands from said communication channel or for deriving said second power control commands from one of default power control commands or modifications to said first power control commands;
         wherein said first power control commands are derived when said mobile station is in a low Doppler condition, and wherein said second power control commands are derived when said mobile station is in a high Doppler condition; and
   transmitter circuitry for transmitting said selectively derived power control commands to said base station.

14. A wireless telecommunications mobile station as in claim 13, wherein said power control circuitry determines the mobility using one of a zero crossing rate, a level crossing rate, or a covariance function estimation routine.

15. A wireless telecommunications mobile station as in claim 13, wherein said default power control commands are comprised of repeated power up and power down commands.

16. A wireless telecommunication mobile station as in claim 13, wherein said modifications to said first power control commands are formed by integrating said first power control commands over a period of time.

17. A wireless telecommunications mobile station as in claim 16, wherein the period of time is comprised of at least one frame period.

18. A wireless telecommunications mobile station, said mobile station comprising a transceiver for being bidirectionally coupled to a base station through a radio communication channel, said mobile station further comprising:

receiver circuitry for receiving signals over said radio communication channel from said base station;

power control circuitry for determining a mobility of said mobile station relative to said base station and for providing, in cooperation with said base station, closed loop power control to the radio communication channel, said power control circuitry comprising circuitry for selectively deriving power control commands based on one of first power control commands or second power control commands in response to the determined mobility of said mobile station relative to said base station, said second power control commands including open loop power control commands, wherein said power control circuitry determines the mobility by estimating a velocity of said mobile station, and further compares the estimated velocity to a velocity threshold value for selectively deriving the power control commands based on one of the first power control commands or the second power control commands; and transmitter circuitry for transmitting said selectively derived power control commands to said base station.

19. A wireless telecommunications mobile station as in claim 18, wherein said velocity threshold value is above about 30 km/h in a frequency band of about 2 GHz, and over about 60 km/h in a frequency band of about 1 GHz.

20. A method of operating a wireless telecommunications mobile station, comprising the steps of:

bidirectionally coupling a base station to the mobile station through a radio communication channel;

determining a Doppler condition of the mobile station;

selectively deriving power control commands based on one of first power control commands or second power control commands in response to determining the Doppler condition, the second power control commands providing open loop power control to the radio communication channel; and wherein the first power control commands are derived from the radio communication channel when the mobile station is in a low Doppler condition, and wherein the second power control commands are derived from one of default power control commands or modifications to the first power control commands when the mobile station is in a high Doppler condition.

21. A method as in claim 20, wherein the step of determining includes steps of:

estimating a velocity of the mobile station; and comparing the estimated velocity to a velocity threshold value; wherein the estimated velocity is used for selectively deriving the power control commands based on one of the first power control commands or the second power control commands.

22. A method as in claim 21, wherein the velocity threshold value is above about 30 km/h in a frequency band of about 2 GHz, and over about 60 km/h in a frequency band of about 1 GHz.

* * * * *